United States Patent

[11] 3,554,525

| [72] | Inventors | Arie Adrianus De Koning<br>Paradijs;<br>Kornelis Korstiaan Karel De Koning,<br>Kwaksewegl, Oud-beijerland, Netherlands |
|---|---|---|
| [21] | Appl. No. | 759,093 |
| [22] | Filed | Sept. 11, 1968 |
| [45] | Patented | Jan. 12, 1971 |
| [32] | Priority | Sept. 22, 1967 |
| [33] | | Netherlands |
| [31] | | No. 6,712,963 |

[54] HYDRO-PNEUMATIC SPRING ELEMENT
10 Claims, 1 Drawing Fig.

[52] U.S. Cl. .................................................... 267/64
[51] Int. Cl. ................................................ B60g 11/28

[50] Field of Search ............................................ 267/64, 65;
188/88.5

[56] References Cited
UNITED STATES PATENTS

| 3,389,903 | 6/1968 | Schmid | 267/64 |
| 3,430,977 | 3/1969 | Riehl | 267/64 |

*Primary Examiner*—James B. Marbert
*Attorney*—Diller, Brown, Ramik & Holt

ABSTRACT: A spring element having a damping effect and comprising a cylinder and two fluid reservoirs disposed concentrically relative to each other and to said cylinder and extending substantially throughout the longitudinal extent of the latter.

PATENTED JAN 12 1971
3,554,525
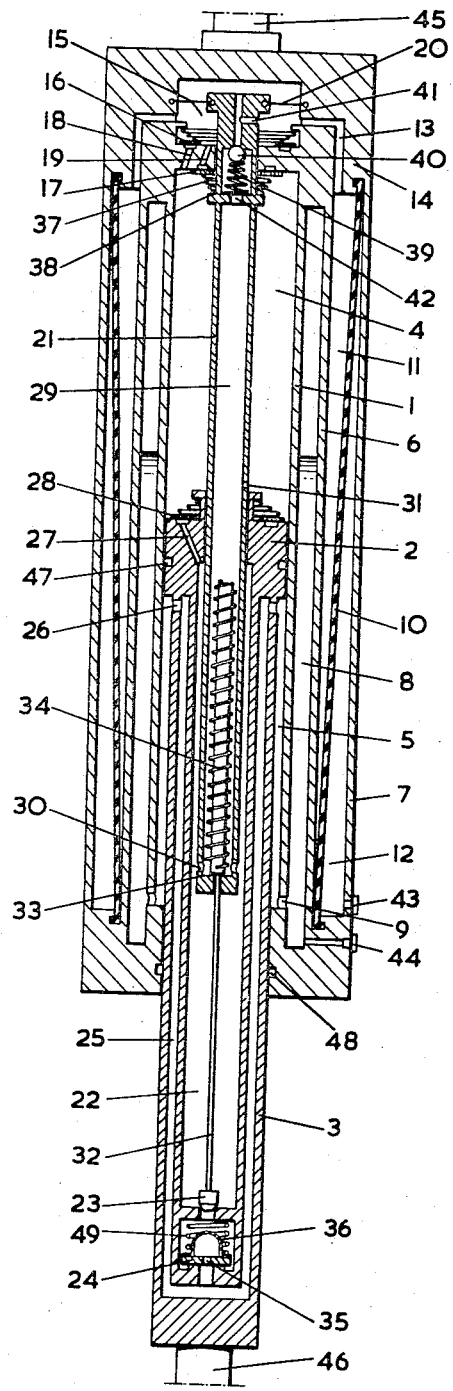
INVENTORS
Arie Adrianus de Koning
Kornelis Korstiaan Karel de Koning
BY
Mason, Porter, Diller & Brown
ATTORNEYS

HYDRO-PNEUMATIC SPRING ELEMENT This invention relates to a hydropneumatic spring element having a damping effect, particularly for road vehicles, said spring element being provided with a liquid-filled cylinder which is divided by a piston, mounted on a hollow piston rod, into a main spring chamber, located at the bottom side, and an auxiliary spring chamber, located at the side of the piston rod, said spring chambers respectively communicating with a main reservoir and an auxiliary reservoir, said reservoirs being partly filled with gas under pressure, there being provided a pumping device comprising a pump chamber disposed in the hollow piston rod and equipped with a suction valve connecting said pump chamber with said auxiliary spring chamber and a delivery valve which connects said pump chamber with said main spring chamber, as well as a pump rod secured to the cylinder bottom and extending through the piston into the pump chamber, said pumping device, during the operation of the spring element, pumping liquid from said auxiliary spring chamber to said main spring chamber, means being provided for allowing liquid to escape from said main spring chamber when the spring element has a predetermined height, thereby to keep the vehicle at a substantially constant level independently of the load.

In present-day vehicle technology, such spring elements have to satisfy high standards as regards smooth operation, especially in the transition from the ingoing to the outgoing stroke and vice versa, gradual return to the neutral position without a pressure drop, sealing against leakage of liquid when the element is stationary under a load, and compactness of design.

It is known to provide large gas chambers, necessary for smooth springing action, by disposing these in line with, or separately from the spring element. The dimensions of the whole structure can then become so large as to create difficulties in building-in the structure. It has also been proposed to arrange the two gas chambers in line with each other concentrically around the cylinder. In that case the dimensions of the gas chambers are limited, particularly if there is used a membrane for separating the liquid from the gas chamber to prevent gas being drawn into the cylinder.

The height of such a membrane is then also limited, at the expense of the smooth operation and service life. In a conventional height control arrangement, one or more openings in the cylinder wall are cleared by the piston when the spring element has a predetermined height, thereby to bring the main spring chamber into direct communication with an auxiliary reservoir.

When the piston is provided with a sealing ring, to prevent leakage along the piston when the spring element is stationary under a load, the sealing ring will be subjected to severe conditions of wear owing to its repeated movements along the openings in the cylinder wall.

Another disadvantages is the sudden pressure drop which occurs in such constructions. Although this can be ameliorated by making the openings very small, there is then the danger that the openings become clogged, so that the height control would fail to operate.

It is an object of the present invention to provide a spring element of the kind defined in the opening paragraph of this specification hereinafter referred to as a spring element of the kind described, incorporating means for obviating the above and other disadvantages.

According to the invention, there is provided a spring element of the kind described, wherein the two reservoirs are located concentrically relative to each other and to the cylinder and extend substantially throughout the longitudinal extent of the latter, the pump rod being provided with an axial bore terminating in the pump chamber and, when the spring element has a predetermined height, communicating through a plurality of radially extending bores with the main spring chamber, the suction valve provided in the piston rod being connected to the pump rod for axial movement, said movement being defined by a stop means to ensure that, when the spring element has a predetermined height, the suction valve is lifted and the pump chamber is in communication with the auxiliary spring chamber.

It is thus achieved that a membrane, necessary for the separation between liquid and gas, can be provided over a substantial length, so that its deformation during the operation of the spring element is minimized.

According to the invention, the radially extending bores communicating with the axial bore in the pump rod terminate at the periphery of that part of the pump rod which extends into the piston.

These bores limit the height to which the spring element can be pump-up and are not provided in the cylinder wall, so that the packing of the piston cannot be damaged by them.

According to a further feature of the invention, the suction valve is connected to the pump rod through a valve stem which extends into the axial bore in the pump rod and abuts against an end wall of said bore in a predetermined position relative to the pump rod.

Further features and advantages of the spring element according to the invention will become apparent from the following description with reference to the accompanying drawing, which illustrates, by way of example, one embodiment of the spring element in cross section.

Referring to the drawing, there is shown a cylinder 1 accommodating a piston 2 secured to a piston rod 3 and dividing the cylinder into a main spring chamber 4 and an auxiliary spring chamber 5. Concentrically disposed around the cylinder 1 are a cylinder 6 and a cylinder 7, which extend substantially throughout the length of the cylinder 1.

Between the cylinders 1 and 6, there is formed an auxiliary reservoir 8, which is partly filled with liquid and partly with gas under pressure, and below the liquid surface communicates through one or more openings 9 with the auxiliary spring chamber 5. The space between the cylinders 6 and 7 serves as the main reservoir and is provided with a membrane 10 which divides the main reservoir into a liquid chamber 11 and a gas chamber 12.

The liquid chamber 11 has a connection 13 with a chamber 15 disposed below the cylinder bottom 14, which chamber 15 communicates through bores 18, 19, controlled by a nonreturn valve 16 and a damping valve 17, with the main spring chamber 4. In the chamber 15, one end of a pump rod 21 is movably mounted by means of an annular leaf spring 20, the other end of the pump rod 21 passing through the piston 2 into a pump chamber 22.

The pump chamber 22 is provided with a suction valve 23 and a nonreturn valve 24, the two valves being disposed in series and controlling the connection between the pump chamber and an annular chamber 25 which, through one or more bores 26, is in communication with the auxiliary spring chamber 5.

The pump chamber 22 also communicates through one or more bores 27 in the piston 2, controlled by a delivery valve 28, with the main spring chamber 4. A second connection between the pump chamber 22 and the main spring chamber 4 can be formed by an axial bore 29 in the pump rod 21, which on one end is in open communication, through openings 30, with the pump chamber 22, and from which one or more bores 31 debouch into the main spring chamber 4. The suction valve 23 is connected to a valve stem 32, which extends into the bore 29 of the pump rod and is capable of axial movement relative to the pump rod, said movement being defined by an abutment 33.

A tension spring 34 urges the valve stem 32 towards the abutment 33. The nonreturn valve 24 is provided with a throttle opening 35 of restricted cross-sectional area, above which is provided a sieve 36 free from the bore. The damping valve 17 is biased by a spring 37, which is supported by a collar 38 of the pump rod 21. In the pump rod 21 is further provided a safety valve 40, biased by a spring 39, and controlling communication between the chamber 15 and the pump rod bore 29 through the openings 41, 42.

The operation of the hydropneumatic spring element is as follows:

Before the spring element is put into service, a quantity of gas under pressure is introduced into both the main reservoir 12 and the auxiliary reservoir 8, such that the desired spring characteristics are obtained, the pressure differential and the difference in surface area of the pistons on which these pressures act being determinative of the carrying capacity of the spring element.

The filling openings are sealed with plugs 43, 44. The spring element is at the top connected with the vehicle portion to be sprung, by suitable means 45, and at the piston rod with the vehicle chassis, by suitable means 46.

In the central position of the spring element as shown, the pressure of the liquid in the main spring chamber 4 also prevails in the axial bore 29, through the bores 31, and in the pump chamber 22, through the bores 30, while the valve stem 32 is just free from the abutment 33.

Upon compression, the pump rod 21 is forced into the pump chamber, thereby pumping a corresponding volume of liquid from the pump chamber 22, initially through the bores 31, and upon further compression, when the bores 31 are covered by the piston 2, through the bores 27 and through the delivery valve 28 into the main spring chamber 4, while the liquid displaced by the piston 2 is pressed through the bores 18 and the nonreturn valve 16 into the liquid chamber 11 of the main reservoir.

As a result the membrane 10 will be deformed against the pressure prevailing in the gas chamber 12, which deformation is only slight owing to the great length of the membrane. When the spring element subsequently expands or "springs back" the pressure in the pump chamber 22 will be reduced as a result of the pump rod 21 moving out of the chamber, which opens the nonreturn valve 24 and the suction valve 23 and causes liquid to flow from the annular chamber 25 into the pump chamber 22.

The pump movement as described continues until the bores 31 remain free from the piston 2. In that case the liquid continues to flow back and forth between the pump chamber 22 and the main spring chamber 4 through the bores 31.

Upon still further expansion the valve stem 32 is taken along by the abutment edge or stop means 33 of the pump rod 21 and the suction valve 23 is lifted from its seat. As a result, liquid will flow from the main spring chamber 4 through bores 31, axial bore 29, bores 30, pump chamber 22, suction valve 23, throttle opening 35, annular chamber 25 and bores 26 to the auxiliary spring chamber 5. Consequently, an open communication is established between the two spring chambers, so that the spring element will contract until the valve stem 32 is released and the suction valve 23 will close the connection under the action of the spring 34.

By suitably positioning the bores 31 relative to the abutment edge 33, it is possible to determine a stroke range of the spring element within which there is no pumping action and no pressure relief, so that unnecessary wear of the parts concerned is avoided.

The communication between the two spring chambers is solely effected by way of the pump chamber 22. The cylinder can accordingly be formed with a continuous wall, which has a favorable effect on the service life of the piston packing 47.

It is not necessary to arrange for packing between the pump rod 21 and the piston 2, for, except during the suction stroke, the same pressure prevails in the main spring chamber and in the pump chamber 22, and the suction valve 23 serves as a sealing means in the stationary position of the spring element. The bores 31 may therefore also be formed as, for example, a slot, which, as it is uncovered by the piston, will also act as a gradually increasing passage opening.

The piston rod passage is provided with a packing ring in known manner. To prevent, as much as possible, a sudden drop in pressure on the pump rod 21 at the beginning of the outgoing stroke of the spring element and a subsequent sudden pressure increase occurring at the beginning of the ingoing stroke of the spring element or when the bores 31 are uncovered, the pump rod is resiliently mounted on the cylinder bottom 14.

For the same reason, the spring 37 for the damping valve 17 is supported by the collar 38 of the pump rod 21.

The reduction in pressure on the pump rod which yet occurs at the beginning of the outgoing stroke results in an inward movement of the pump rod owing to the resilient mounting 20, which will reduce the tension of the spring 37, whereas the increase of the pressure acting on the pump rod will move it outwardly, which increases the tension of the spring. As soon as the spring element, during its outgoing stroke, passes the central position and uncovers the bores 31, the pump rod 21 will be relieved of pressure and move to the position as shown.

The tension of the spring 37, and hence the damping resistance of the valve 17, will then increase. The object of this is to dampen the suddenly stronger upward force of the spring element resulting from the fact that the surface of the pump rod is subjected to the same pressure as prevails in the main spring chamber.

To prevent a sudden pressure drop after the suction valve 23 has been lifted, the valve 24, which is loaded with a light spring 49 and has a throttle opening 35, is placed in series with the suction valve 23. By virtue of the fact that the throttle opening 35 is axially spaced from the suction valve 23, it is possible to provide a sieve 36 having a large passage area.

The safety valve 40 provided in the pump rod 21 serves for preventing the spring element from being pumped to unduly high pressures when the vehicle is overloaded. During the suction stroke the pump chamber 22 will then be filled from the main reservoir 11 via the valve 40, which quantity of liquid will be returned to the main spring chamber 4 during the compression stroke.

We claim:

1. A hydropneumatic spring element having a damping effect, particularly for road vehicles, said spring element being provided with a liquid-filled cylinder which is divided by a piston, mounted on a hollow piston rod, into a main spring chamber, located at the bottom side, and an auxiliary spring chamber, located at the side of the piston rod, said spring chambers respectively communicating with a main reservoir and an auxiliary reservoir, said reservoirs being partly filled with gas under pressure, there being provided a pumping device comprising a pump chamber disposed in the hollow piston rod and equipped with a suction valve connecting said pump chamber with said auxiliary spring chamber and a delivery valve which connects said pump chamber with said main spring chamber, as well as a pump rod secured to the cylinder bottom and extending through the piston into the pump chamber, said pumping device, during the operation of the spring element, pumping liquid from said auxiliary spring chamber to said main spring chamber, means being provided for allowing liquid to escape from said main spring chamber when the spring element has a predetermined height, thereby to keep the vehicle at a substantially constant level independently of the load, wherein the two reservoirs are located concentrically relative to each other and to the cylinder and extend substantially throughout the longitudinal extend of the latter, the pump rod being provided with an axial bore terminating in the pump chamber and, when the spring element has a predetermined height, communicating through a plurality of radially extending bores with the main spring chamber, the suction valve provided in the piston rod being connected to the pump rod for axial movement, said movement being defined by a stop means to ensure that, when the spring element has a predetermined height, the suction valve is lifted and the pump chamber is in communication with the auxiliary spring chamber.

2. A hydropneumatic spring element according to claim 1, wherein the radially extending bores communicating with the axial bore in the pump rod terminate at the periphery of that part of the pump rod which extends into the piston.

3. A hydropneumatic spring element according to claim 1, wherein the suction valve is connected to the pump rod through a valve stem which extends into the axial bore in the pump rod and abuts against an end wall of said bore in a predetermined position relative to said pump rod.

4. A hydropneumatic spring element according to claim 3, wherein the valve stem is biased towards the abutment in the pump rod by a tension spring arranged about the valve stem.

5. A hydropneumatic spring element according to claim 1, wherein a one-way valve is provided in series with said suction valve, said one-way valve having a passage of restricted cross-sectional area.

6. A hydropneumatic spring element according to claim 5, wherein said passage of restricted cross-sectional area is provided with a sieve located on the side of the pump chamber and being free from the throttle opening.

7. A hydropneumatic spring element according to claim 1, wherein the pump rod is resiliently secured to the cylinder bottom.

8. A hydropneumatic spring element according to claim 7, wherein the pump rod is mounted by means of an annular leaf spring, whose inner circumference is secured around the pump rod and whose outer circumference is secured in the cylinder bottom.

9. A hydropneumatic spring element according to claim 7, wherein the spring of the damping valve is supported on a collar formed on the pump rod.

10. A hydropneumatic spring element according to claim 1, wherein the pump rod is provided with a safety valve which under overload conditions of the spring element connects the main reservoir with the axial bore in the pump rod.